Figure 1:
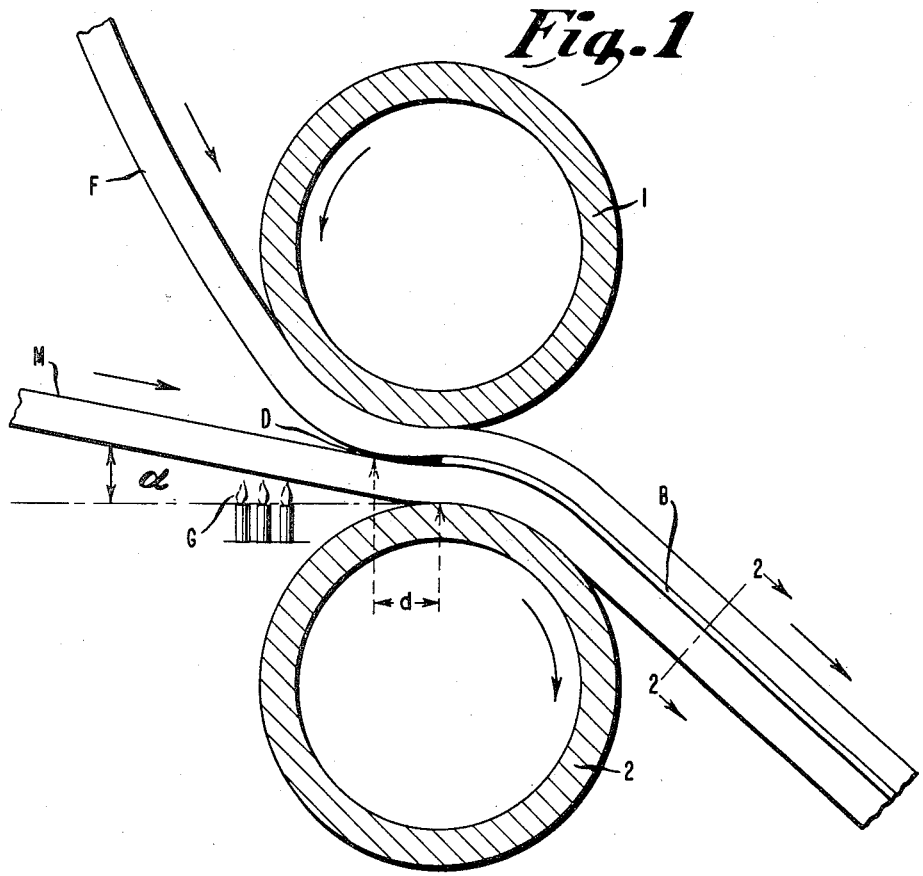

THERMOPLASTIC FILM-METAL-LAMINATED STRUCTURE AND PROCESS

Filed Jan. 19, 1956

INVENTOR
CHRISTIAN B. LUNDSAGER

BY

ATTORNEY

United States Patent Office 2,861,022
Patented Nov. 18, 1958

2,861,022

THERMOPLASTIC FILM-METAL-LAMINATED STRUCTURE AND PROCESS

Christian Bent Lundsager, Fairfax, Del., assignor to E. I. du Pont de Nemours and Company, Wilmington, Del., a corporation of Delaware Application January 19, 1956, Serial No. 560,175

6 Claims. (Cl. 154—129)

This invention relates to laminations comprising metal and crystalline, oriented, heat-set, quenchable, thermoplastic polymeric film and, more particularly, to laminations of oriented, heat-set polyethylene terephthalate film to metal.

The preparation of the novel class of film- and fiber-forming linear polyesters of terephthalic acid and a glycol of the series $HO(CH_2)_nOH$, where "$n$" is an integer from 2–10, inclusive, is fully disclosed in U. S. Patent 2,465,319 to Whinfield and Dickson. From a commercial standpoint, one of the most attractive polymers of this class is polyethylene terephthalate; and the most promising process for its production comprises carrying out an ester interchange between ethylene glycol and dimethyl terephthalate to form bis-2-hydroxy ethyl terephthalate monomer which is polymerized to polyethylene terephthalate under reduced pressures and at elevated temperatures.

Oriented, heat-set polyethylene terephthalate film, e. g., film which has been stretched or rolled to substantially the same extent in both directions and heat-set at temperatures in the neighborhood of 200° C. under tension, is a highly versatile material because of its balanced physical properties, excellent electrical properties, and outstanding resistance to chemical degradation. The film may be employed to advantage as a dielectric in a wide variety of electrical applications, e. g., insulation in motors, transformers, wires and cables, capacitors, etc. Furthermore, the film is highly useful for such applications as sound recording tape, as a plastic glazing material, as a protective covering for thermal insulation, sound insulation, etc., as a material of construction for transparent containers, piping, bottle closures, and as a versatile packaging material.

Although polyethylene terephthalate film may be employed as the sole structural material in a great variety of end uses, its usefulness as a structural material in laminations to other base materials, particularly metal foils, sheets and the like is also of tremendous importance.

An object of the present invention, therefore, is to provide laminations of crystalline, oriented, heat-set, quenchable, thermoplastic polymeric film to a layer of metal. A further object of the present invention is to provide a process for the lamination of crystalline, oriented, heat-set, quenchable, thermoplastic polymeric film to metal, particularly to metal sheets and foils. A still further object is to provide laminations of crystalline, oriented, heat-set, quenchable, polyethylene terephthalate film to a layer of metal. Other objects will be apparent from the following description of the invention.

These objects are realized by tne present invention which, briefly stated, comprises heating the metal surface to which crystalline, oriented, heat-set, quenchable thermoplastic film is to be bonded to a temperature above the melting point of said film, bringing the surface of said film into contact with the heated metal surface whereby to effect superficial melting of said film surface and the formation of a laminated structure of metal and film and immediately thereafter rapidly cooling the laminated structure whereby to produce a structure composed of metal joined to thermoplastic film, the contacting surface of the film being substantially amorphous and the body portion being substantially crystalline, oriented and heat-set.

Although the present process will be hereinafter described with particular reference to the laminating to metal of polyethylene terephthalate film which has been oriented, i. e., stretched and/or rolled in two directions and heat-set while maintained under tension, i. e., to prevent shrinkage at temperatures usually within the range between 150°–250° C., it should be understood that the present invention may be applied to other types of crystalline, oriented, heat-set, quenchable, thermoplastic films, such as polyamides and other types of polyesters such as those copolyesters formed by reacting glycol, terephthalic acid, and isophthalic acid.

By the expression "quenchable, thermoplastic, polymeric film," as used herein, is meant a film formed from a thermoplastic, normally crystalline polymer which, when quenched, i. e., cooled rapidly from a melt, solidifies in the amorphous state. It is characteristic of such polymers that when they are slowly cooled from the molten state, they solidify to substantially a crystalline state; and, further, when such polymers in the solid amorphous state are heated, they assume their normal crystalline state.

The term "oriented," as used herein, refers to film which has been stretched (elongated) in two directions, or to film which has been rolled in two directions, or to film which has been stretched in one direction and rolled in a direction perpendicular thereto. For normal usage and for application in a wide variety of end uses, the oriented film is substantially balanced, that is, the physical properties as measured in both directions are substantially equivalent.

The term "crystalline" as applied to films which may be treated in accordance with the present process means that the film exhibits a crystalline structure when examined by X-ray defraction techniques. In the case of polyethylene terephthalate film which, for example, has been stretched 3X (where X equals its original dimension) in both the transverse and longitudinal directions and heat-set at a temperature within the range from 150°–250° C. the film exhibits a crystalline structure. The density of the material indicates that the degree of crystallinity is about 40%. For example, amorphous unoriented polyethylene terephthalate film has a density at 30° C. of 1.33 grams per cc. X-ray studies indicate a density calculated from the dimensions of the triclinic unit cell of 1.47 grams per cc. for the theoretically pure crystalline polymer. Polymer having a density between 1.33 and 1.47 exhibits varying degrees of crystallinity. Polyethylene terephthalate film stretched 3X at a temperature between 80° and 90° C. and thereafter stretched transversely (3X) at a temperature between 95° and 100° C., followed by heat-setting under tension within a temperature range of 150°–250° C., has a density from 1.39 to 1.40 grams per cc., indicating a degree of crystallinity of about 40–42%.

The term "melting point" of the crystalline, oriented, polymeric films treated in accordance with the present process applies to the crystalline melting point, which is normally expressed in terms of crystalline melting temperature range rather than single temperature or point. In general, the crystalline melting temperature is defined as that range wherein the lower temperature is that at which the crystalline structure begins to disappear at an appreciable rate and the upper temperature is the lowest temperature at which the crystallites are not evidenced by X-ray examination. Hence, as employed herein, the term "melting point" will refer to the lowest temperature at which the polymeric film no longer exhibits a crystalline structure as evidenced by X-ray examination. For example, in the case of polyethylene terephthalate films stretched 3X in both directions and heat-set at about 200° C., the crystalline melting point is within the range of 250°–255° C.

The present invention resides in the discovery that superior laminates of metal and crystalline, oriented, heatset, quenchable, thermoplastic films are formed when the film surface in contact with the metal is superficially melted and is thereafter rapidly cooled. As is fully described in my copending application, U. S. Serial No. 455,240, the surface stratum of the quenchable, crystalline, oriented, heat-set, thermoplastic film such as polyethylene terephthalate may be easily converted from crystalline to amorphous form. It is believed that this conversion is accomplished in the present process as the surface layer is melted momentarily by contact with the hot metal and then is rapidly quenched. X-ray examination of the metal-contacting surface stratum of the laminated polyethylene terephthalate film of the present invention shows no similarities with the X-ray diagrams of the crystalline polyethylene terephthalate of the original film before undergoing the process of the present invention. Furthermore, the densities of the polymer scraped from the surface stratum of the laminated polyethylene terephthalate film is below the density of the film prior to lamination. It is in this transformation of the metal-contacting surface of the polyethylene terephthalate film from the crystalline to the adhesive, amorphous form that the crux of this process lies. Thus, through this phenomena, metal may be laminated onto a crystalline, oriented, heat-set, quenchable, thermoplastic film without employing the use of adhesives. Not only is a stronger metal-film bond obtained by the elimination of adhesives, but also the inherent desirable properties of the film are not impaired, i. e., adhesives restrict the properties of the lamination to those properties of the adhesive itself.

Heating of the metal and cooling of the laminate in accordance with the principles of this invention may be effected by any suitably convenient expedient. A preferred procedure in the laminating of sheet metal to film is to pass the metal and crystalline, oriented, heat-set, quenchable, thermoplastic film through a nip of two cold metal rolls, where the metal has been heated by flame or other heating means immediately before entering the nip of the rolls. In carrying out the present process, it is highly important that cooling take place immediately after the film and metal are brought together. Excessive contact time between the film and the hot metal, depending upon the actual thickness of the film, may result in shrinkage of the film or in actual melting of the entire cross-section of the film and, consequently, tear or destroy the film entirely. Owing to the elevated temperature, i. e., above the melting point of the polymeric film, at which the heated metal must be maintained to derive the benefits of the present process, the film surface is modified to the desired degree upon substantial instantaneous contact with the heated metal.

Figure 2:
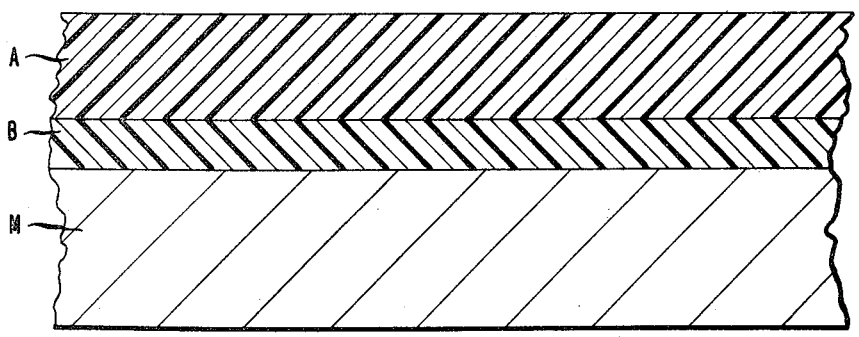

The process of the present invention, and the resulting laminations will now be described with reference to the accompanying drawings wherein:

Fig. 1 is a diagrammatic illustration of a preferred mode of laminating crystalline, oriented, heat-set, quenchable, thermoplastic film to metal in accordance with the process of this invention, and Fig. 2 is a cross-section of the laminate taken on the line 2—2 of Fig. 1.

Referring to Fig. 1, the crystalline, oriented, heat-set, quenchable film F is fed from an unwind roll (not shown) into the nip of two cold rolls 1 and 2. Just previous to entering the nip of these cold rolls, the film comes in contact with the metal M which is being unwound from an unwind roll (not shown) or which is being supplied from any other convenient source, heated under flame G to a point above the melting point of the film as hereinbefore specified, and thereafter moved in contact with the film at D. Fig. 1 shows the film and the metal coming into contact at D. The distance $d$ shown in this figure, is the distance the laminate travels before the metal comes into contact with the cold roll 2, after the metal comes into contact with the film. The distance $d$ can be controlled by varying the angle $\alpha$ under which the metal is fed to the rolls. It is during the traveling of this distance that the surface of the crystalline film is melted by the heat from the metal. Upon entering the nip of the cold rolls, however, the film and metal are rapidly chilled, and it is this action of melting, followed by rapid chilling, that results in the surface stratum of the film F, in contact with the metal stratum, being converted into an amorphous polymer which acts as a layer of adhesive B, bonding together the oriented, heat-set, thermoplastic film and the metal to form a stable laminate. After being quenched, the laminate is then fed to a suitable windup roll (not shown) or otherwise suitably collected. Because of the heat-insulating properties of the film and the heat capacity of the metal, the cooling action of the roll 2 may be delayed enough so that the feeding of the metal at the angle $\alpha$ to obtain the travel distance $d$ is unnecessary. This will be true particularly in the case of thick films and metal. Fig. 2 shows the finished product of the process of the invention in cross-section. The top stratum A is composed of crystalline, oriented, heat-set, thermoplastic film, retaining substantially all the inherent physical properties of the original film F. The intermediate stratum B is a layer of amorphous polymer which acts as an adhesive, and a bottom layer is the metal M which is bonded by the intermediate amorphous polymeric layer to the top layer of crystalline film. It may be advantageous to introduce a coolant into the cold rolls 1 and 2, so as to advance the quenching action of the molten surface stratum.

When heavier gauge metal sheeting, e. g. 0.0625", is employed, it may be necessary to supplement the cold rolls with the spraying of cold water on the metal as soon as it leaves the nip of the rolls. It is of vital importance that the quenching action take place before overheating of the film occurs in any particular area, which might result in the entire cross-section of the film being melted away. By allowing the film to be in contact with the metal in the heated state, only over a short interval ($d$ in Fig. 1) before it is cooled, the metal-contacting surface stratum is satisfactorily melted while the main body of film remains unchanged in its crystalline condition.

The following examples will further serve to illustrate the principles and practice of the present invention.

*Example 1*

Polyethylene terephthalate film (0.007 mil) is placed on a resilient backing (cardboard). Aluminum foil (0.002 mil) is heated with a Bunsen burner to a temperature above that of the polyethylene film and then is placed on top of the film. A cold metal roll is immediately thereafter passed over the foil. The resulting polyethylene terephthalate-aluminum foil laminate has a metal-film bond strength in excess of 2,000 grams.

*Example 2*

Polyethylene terephthalate film .007" in thickness (which has been stretched 3X in the machine direction at a temperature between 80°–90° C. and stretched 3X in the transverse direction at a temperature between 95°–110 C., and heat-set at a temperature in the neighborhood of 200° C.), is fed from an unwind roll into the nip of two cold metal rolls where it comes in contact with .002" thick aluminum foil which has been passed over a series of burners before entering the nip of the cold rolls such that the temperature of the foil is in excess of 300° C. The heat of the foil upon coming in contact with the polyethylene terephthalate film melts the surface of the film and upon passing through the cold rolls becomes firmly united to the film by reason of the adhesive properties of the amorphous polyethylene terephthalate film formed by the contact of the hot foil on the surface of the film. Further melting of the interior of the polyethylene terephthalate film is prevented by the almost immediate quenching action of the cold rolls. The laminate produced has a metal-film bond strength in excess of 2,000 grams. The properties of the interior of the polyethylene terephthalate film are not impaired to any discernible degree.

*Example 3*

Polyethylene terephthalate film 0.005 inch thick which has been stretched three times its original length in two directions perpendicular to each other and heat-set at 200° C. is laminated to 0.001 inch thick aluminum foil in the following manner: A sheet of the foil is covered with a sheet of film and the two layers are placed together on top of a hot plate, with the foil in contact with the hot plate. The temperature is measured with a surface pyrometer to 300° C. Immediately after placing the two layers on the hot plate, a smooth metal bar is slid over the surface of the polyethylene terephthalate film in order to produce momentarily intimate contact between the hot plate and the foil, and between the foil and the film. Immediately thereafter, the finished laminate is removed from the hot plate. The total time for the operation is in the order of ½ second.

The foil is then peeled from the film and the material is scraped off the surface of the film which had been in contact with the foil. X-ray diagrams of this surface material are those typical for amorphous polyethylene terephthalate. On the other hand, the characteristics of the film, except that of the very surface layer which had been in contact with the aluminum foil, are those of oriented crystalline polyethylene terephthalate film.

The bond strength of this laminate, measured by peeling the aluminum foil and the polyethylene terephthalate film apart in conventional testing apparatus, is about 400 grams/inch width of the laminate.

It is obvious from the foregoing description that the process of the present invention leads to an improved metal-thermoplastic film laminate not only possessing an unusually strong bond between the layers, but also one in which the desirable properties of the film are essentially retained, such as electrical properties and resistance to chemical degradation. These metal-film laminates, as described hereinbefore with particular reference to a polyethylene terephthalate/aluminum foil laminate, find an innumerable variety of uses. They may be fabricated into cans, large drums, container linings, and other types of containers; they may be used in the manufacture of heat insulation, vapor barriers, sound insulation, car upholstery, printed films, metallic yarn, and other decorative materials. These laminates may also be stamped or postformed into various shapes such as trays, dishes, counter tops, construction panels, etc.

I claim:

1. A process for laminating crystalline, oriented, heat-set polyethylene terephthalate film to metal which comprises, (1) heating the surface of the metal to which a crystalline, oriented, heat-set polyethylene terephthalate film is to be bonded to a temperature above the melting point of said film; (2) bringing the surface of said film into contact with the heated metal surface maintained at said temperature whereby to effect superficial melting of said film surface; and (3) immediately thereafter quenching the film and metal in contact therewith to rapidly cool the superficially melted surface of said film to the solid amorphous state whereby to produce a tightly bonded laminated structure of said film and metal.

2. The process of claim 1 wherein the metal is aluminum.

3. A process for continuously laminating crystalline, oriented, heat-set polyethylene terephthalate film to sheet metal which comprises, (1) continuously passing a continuous web of sheet metal through a heating zone effective to heat the surface of the metal to a temperature above the melting temperature of crystalline, oriented, heat-set polyethylene terephthalate film to which said metal is to be bonded; (2) continuously bringing a continuous web of said film into contact with the heated sheet metal surface maintained at said temperature to effect superficial melting of the film surface in contact with said sheet metal surface; and (3) immediately thereafter continuously passing said web of sheet metal and said web of film in contact therewith through a cooling zone effective to rapidly cool the superficially melted surface of the film to the solid amorphous state whereby to continuously produce a tightly bonded laminated structure of said film and said sheet metal.

4. The process of claim 3 wherein said sheet metal is aluminum.

5. A laminated structure consisting of a bottom layer of metal, an intermediate bonding layer of amorphous polyethylene terephthalate, and a top layer of crystalline, oriented, heat-set, polyethylene terephthalate film.

6. A laminated structure consisting of a bottom layer of sheet aluminum, an intermediate bonding layer of amorphous polyethylene terephthalate, and a top layer of crystalline, oriented, heat-set, polyethylene terephthalate film.

References Cited in the file of this patent

UNITED STATES PATENTS

| | | |
|---|---|---|
| 2,419,387 | Bierer | Apr. 22, 1947 |
| 2,434,541 | Bierer | Jan. 13, 1948 |
| 2,485,294 | Kropa | Oct. 18, 1949 |
| 2,514,196 | Bradley | July 4, 1950 |
| 2,650,213 | Hofrichter | Aug. 25, 1953 |
| 2,702,580 | Bateman | Feb. 22, 1955 |
| 2,714,569 | Prindle et al. | Aug. 2, 1955 |
| 2,728,703 | Kiernan et al. | Dec. 27, 1955 |
| 2,765,250 | Williams | Oct. 2, 1956 |